(12) United States Patent
Elser et al.

(10) Patent No.: US 11,984,711 B2
(45) Date of Patent: May 14, 2024

(54) METHOD FOR PRODUCING AN ELECTRICAL POWER DEVICE BY ADDITIVE MANUFACTURING TECHNIQUES

(71) Applicant: HITACHI ENERGY LTD, Zürich (CH)

(72) Inventors: Pierre Elser, Zürich (CH); Lukasz Matysiak, Cracow (PL); Robert Sekula, Cracow (PL); Francesco Agostini, Zürich (CH)

(73) Assignee: HITACHI ENERGY LTD, Zürich (CH)

( * ) Notice: Subject to any disclaimer, the term of this patent is extended or adjusted under 35 U.S.C. 154(b) by 829 days.

(21) Appl. No.: 16/980,459

(22) PCT Filed: Mar. 22, 2019

(86) PCT No.: PCT/EP2019/057306
§ 371 (c)(1),
(2) Date: Sep. 14, 2020

(87) PCT Pub. No.: WO2019/180238
PCT Pub. Date: Sep. 26, 2019

(65) Prior Publication Data
US 2021/0050716 A1    Feb. 18, 2021

(30) Foreign Application Priority Data
Mar. 23, 2018 (EP) .................................... 18163770

(51) Int. Cl.
*H02B 3/00* (2006.01)
*B33Y 80/00* (2015.01)
*H02G 5/06* (2006.01)

(52) U.S. Cl.
CPC ............... *H02B 3/00* (2013.01); *H02G 5/068* (2013.01); *B33Y 80/00* (2014.12)

(58) Field of Classification Search
CPC .......... H02B 3/00; H02G 5/068; B33Y 80/00; B33Y 10/00; B33Y 50/00; B29C 64/386; B29C 64/00; B22F 7/00
(Continued)

(56) References Cited

U.S. PATENT DOCUMENTS 6,519,500 B1    2/2003    White
9,827,713 B1    11/2017   Linnell et al.
(Continued)

FOREIGN PATENT DOCUMENTS

CH          16232 A    10/1898
CN     104103385 A    10/2014
(Continued)

OTHER PUBLICATIONS

Translation of JP 2016031845 (Original document published Mar. 7, 2016) (Year: 2016).*
(Continued)

*Primary Examiner* — William A Bolton
(74) *Attorney, Agent, or Firm* — Sage Patent Group

(57) ABSTRACT

A method for producing an electrical power device from subsequently manufactured parts by an additive manufacturing technique includes determining a target spatial distribution of a physical property of the electrical power device, the physical property being an electrical property and/or a mechanical property; forming a part of the electrical power device; selecting a physical property of a subsequent part of the electrical power device corresponding to the determined spatial distribution of the physical property such as to be different from a corresponding physical property of the part; and by means of the additive manufacturing tech-
(Continued)

nique, forming the subsequent part such that it is at least partially in contact with the part.

An electrical power device is obtainable by the method, and the electrical power device may be used as an AC or DC insulator in an HVAC or HVDC apparatus.

18 Claims, 4 Drawing Sheets

(58) Field of Classification Search
USPC .......................................................... 218/155
See application file for complete search history.

(56) References Cited

U.S. PATENT DOCUMENTS

| | | | |
|---|---|---|---|
| 9,962,767 B2 * | 5/2018 | Buller | B29C 64/40 |
| 10,518,476 B2 | 12/2019 | De Pena et al. | |
| 10,701,812 B2 | 6/2020 | Fenker | |
| 2006/0022379 A1 | 2/2006 | Wicker et al. | |
| 2013/0170171 A1 | 7/2013 | Wicker et al. | |
| 2015/0044084 A1 | 2/2015 | Hofmann et al. | |
| 2015/0262773 A1 * | 9/2015 | Yoshimura | H01H 33/24 200/48 R |
| 2016/0083871 A1 * | 3/2016 | Meure | B05D 1/26 427/256 |
| 2016/0200011 A1 * | 7/2016 | Rothfuss | C04B 35/64 264/494 |
| 2017/0236644 A1 | 8/2017 | Gustafson | |
| 2017/0239885 A1 * | 8/2017 | Knecht | B29C 64/218 |
| 2017/0334139 A1 | 11/2017 | Ammi | |

FOREIGN PATENT DOCUMENTS

| | | |
|---|---|---|
| CN | 104600610 A | 5/2015 |
| CN | 104916378 A | 9/2015 |
| CN | 105321635 A | 2/2016 |
| CN | 106941244 A | 7/2017 |
| CN | 107206668 A | 9/2017 |
| CN | 107457404 A | 12/2017 |
| DE | 4007337 A1 | 9/1991 |
| DE | 102016002052 A1 | 6/2017 |
| EP | 0588359 A2 | 3/1994 |
| EP | 2953437 A1 | 12/2015 |
| JP | S6043010 A | 3/1985 |
| JP | H0622436 A | 1/1994 |
| JP | 2016031845 A | 3/2016 |
| JP | 2016033861 A | 3/2016 |
| RU | 2647540 C1 | 3/2018 |
| RU | 2650167 C2 | 4/2018 |

OTHER PUBLICATIONS

Translation of CN104916378 (Original document published Sep. 16, 2015) (Year: 2015).*
Notice of Reasons for Refusal for Japanese Patent Application No. 2020-550597, dated Mar. 7, 2023, 5 pages.
Chinese First Office Action dated Jun. 15, 2022 for Chinese Patent Application No. 201980021706.7, 11 pages (including English translation).
European Office Action dated Aug. 19, 2022 for European Patent Application No. 19712767.3, 12 pages.
Russian Office Action dated Apr. 27, 2021 for Russian Patent Application No. 2020131253, 8 pages (including English summary).
International Search Report and Written Opinion of the International Searching Authority, PCT/EP2019/057306, dated May 28, 2019, 11 pages.

* cited by examiner

METHOD FOR PRODUCING AN ELECTRICAL POWER DEVICE BY ADDITIVE MANUFACTURING TECHNIQUES

CROSS REFERENCE TO RELATED APPLICATIONS

This application is a 35 U.S.C. § 371 national stage application of PCT International Application No. PCT/EP2019/057306 filed on Mar. 22, 2019, which in turns claims foreign priority to European Patent Application No. 18163770.3 filed on Mar. 23, 2018, the disclosures and content of which are incorporated by reference herein in their entirety.

TECHNICAL FIELD

The present disclosure relates to a method for producing an electrical power device, an electrical power device, and a use of an electrical power device.

BACKGROUND

Electrical power devices such as high voltage, high current AC or DC devices comprise components that are provided for ensuring a suitable electrical insulation of live parts. An example for an electrical power device having an insulation task is a spacer for a gas insulated switchgear.

Molding, such as injection molding, is a common way of manufacturing a component for electrical insulation. Larger insulating parts may be manufactured by a vacuum casting method or an automatic pressure gelation (APG) method. Moreover, Japanese laid-open publication JP 2016 031 845 A describes a spacer for a gas insulated switchgear that is manufactured by means of a three-dimensional modeling device. In this prior-art document, a laminated structure of the insulating spacer has different laminated parts, wherein a compounding ratio of the insulating material used for the laminated parts is changed so that the dielectric constant continuously decreases from one side to the other side of the insulating spacer.

Often, electrical power devices also need to exhibit certain mechanical properties and/or withstand great mechanical stresses. One example of mechanical properties to be fulfilled by such electrical power devices is an essentially gas-tight implementation when the electrical power device is used e. g. in a gas insulated switchgear. Thus, there is a need for an electrical power device providing a suitable mechanical support, e. g. for a conductor, and exhibiting a suitable mechanical withstand, e. g. for pressure differences, while having a suitable insulating function.

SUMMARY

According to an aspect of the present disclosure, a method for producing an electrical power device from subsequently manufactured parts by an additive manufacturing technique is provided. The method comprises determining a target spatial distribution of a physical property of the electrical power device, the physical property being an electrical property and/or a mechanical property; forming a part of the electrical power device; selecting a physical property of a subsequent part corresponding to the determined spatial distribution of the physical property; and by means of the additive manufacturing technique, forming the subsequent part such that it is at least partially in contact with the part.

In embodiments, in the case of the electrical property, the spatial distribution, is a target electrical field pattern of the electrical power device when mounted in a given electrical environment, and in the case of the mechanical property, a target mechanical strength of the electrical power device.

As used herein, a "target" pattern may be interpreted as a "desired" pattern. The target pattern is obtained, for example, by way of simulation. For example, a target electrical field pattern is obtained through a simulation of a spatial distribution of the electric field for a given shape or configuration of the final electrical power device. As another example, a target mechanical strength of the electrical power device is obtained through a simulation of a spatial distribution of the mechanical strength for a given shape or configuration of the final electrical power device.

The part, as used herein, may be a part formed by the same technique used to form the subsequent part. The part may also be as small as technically possible; then, the subsequent part dominates the electrical power device.

The part, as an initial part may already present, and a method as disclosed herein is applied to this initial part in order to complete the electrical power device. It is also possible that no initial part is present when conducting the method, the part is formed by an additive manufacturing technique, and the subsequent part or parts are then formed by an additive manufacturing technique, such as the same technique as the one used for forming the part.

In an aspect, the physical properties in the additive manufacturing technique are varied or chosen, e. g. by using different materials, such that the subsequent part or the subsequent parts have an appropriate, or target, physical property for the respective manufacturing position of the electrical power device.

An additive manufacturing technique, as used herein, is exemplified as any 3D printing technique, such as vat photopolymerization, material extrusion, material jetting, powder based 3D printing, or lamination based 3D printing. Preferably, the additive manufacturing technique is one of vat photopolymerization, material extrusion, material jetting. In a vat photopolymerization technique, a liquid polymer or a mixture of liquid polymers are cured selectively in a vat in a polymerization process that is activated by means of application of light. In a material extrusion technique, a thermoplastic material, a rubber material or the like is selectively deposited through a nozzle or an orifice. In a material jetting technique, droplets of a suitable material are deposited in a selective manner. The various additive manufacturing techniques used as exemplary techniques in this specification are known as such, and thus, their particulars are not described herein.

Typically, in the additive manufacturing technique, the subsequent part is formed as a polymeric material. A polymeric material, as used herein, is exemplified as a thermoplastic material (such as, but not limited to, polyethylene or polyethylene terephthalate), a thermoset material (such as, but not limited to, epoxides), an elastomeric material (such as, but not limited to, rubber materials or silicone), a curable polymeric insulating material, or combinations thereof.

An electrical environment, as used herein, comprises for example the electrical properties and/or the dimensions of an apparatus that the electrical power device is to be used in. For example, the electrical environment is defined as an electrical field or an electrical field distribution between an electrode at a certain voltage and a ground potential. An example for an apparatus is a circuit breaker or a switchgear, such as a gas insulated switchgear. The electrical environment is given, for example, by measurements and/or by simulation.

A target electrical field pattern may be a desired electrical field pattern that is obtained when the electrical power device is or becomes a part of the electrical environment, e. g. by installing an insulating device as the electrical power device within the electrical environment. The electrical power device typically influences the distribution of the electric field in the electrical environment. The electrical property of the subsequent part may then be selected, or chosen, such that the desired electrical field pattern is obtained in the electrical environment, and the subsequent part may then be formed according to the selection.

Typically, determining the spatial distribution of target mechanical strength of the electrical power device includes identifying a path of principal mechanical stress of the electrical power device and performing the selection of the mechanical property of the subsequent part and the forming of the subsequent part includes forming one or more of the subsequent parts having a mechanical strength equal to or greater than a predetermined strength threshold value along the identified path of principal mechanical stress.

A path of principal mechanical stress typically occurs during an actual operation of the electrical power device when it is installed in an apparatus. For example, the path of principal mechanical stress is established due to a certain pressure distribution in a gas insulated switchgear, where a gas pressure acts on one or both sides of an insulating device serving as an electrical power device. As used herein, a path of principal mechanical stress may also comprise plural paths of a comparable mechanical stress level, such as in comparatively thin areas of the electrical power device, in mounting areas of the electrical power device, and the like.

A predetermined strength threshold value may be chosen such that it is large enough to withstand e. g. a certain force that is expected to act on an element of the electrical power device along the path of principal mechanical stress. A force to be expected may be obtained, for example, by performing a measurement operation in an actual apparatus that the electrical power device is to be installed in and/or by simulation.

In embodiments, the subsequent part or parts along the path of principal mechanical stress that have a mechanical strength equal to or greater than the predetermined strength threshold value are surrounded with a lightweight material. Thus, an electrical power device may be obtained that has a relatively dense, high-strength material along the principal stress paths that occur during operation and a material lighter in weight that surrounds this high-strength material, ending up with a light-weight high-strength electrical power device.

In particular, the selection for achieving the target electrical field pattern and the selection for achieving the target mechanical strength are performed concurrently. A concurrent selection may be conducted for the same subsequent part, and in case the concurrent conditions arising from the concurrent selection cannot be obtained simultaneously, one of the target electrical field pattern and the target mechanical strength may be selected, e. g. according to a relative importance in a trade-off consideration. Also, a concurrent selection may be conducted for different subsequent parts such that some of the subsequent parts primarily contribute to achieving the target electrical field pattern, and others of the subsequent parts primarily contribute to achieving the target mechanical strength.

Selecting the physical property, as used herein, is to be understood as an intentional act, e. g. as a part of a design process in which the respective property is chosen according to a specific need. The respective property is typically a predetermined or predeterminable (i. e., selectable) property that may be varied within certain limits. Selecting, as used herein, may involve choosing an acceptable or tolerable range for the respective property, such as a value range not exceeding a certain upper threshold value of the respective property and/or not falling below a certain lower threshold value of the respective property, wherein the respective threshold values fulfil the specific need.

Selecting a certain physical property may involve concurrently selecting the respective other physical property such that the specific needs for all selected physical properties are concurrently fulfilled. For example, selecting the electrical property according to the target electrical field pattern may involve concurrently selecting the mechanical property according to the target mechanical strength, such that both the specific need for the electrical property and the specific need for the mechanical property are fulfilled. Likewise, selecting the mechanical property according to the target mechanical strength may involve concurrently selecting the electrical property according to the target electrical field pattern such that both the specific need for the electrical property and the specific need for the mechanical property are fulfilled.

Selecting a certain physical property may involve concurrently selecting the respective other physical property, and, in the case that fulfilling the specific need for the properties cannot be fulfilled at the same time, choosing which one or which ones of the physical properties is to be fulfilled, e. g. when a level of importance for fulfilling the specific need of one of the properties exceeds a corresponding level of importance for fulfilling the specific need of the other one of the properties.

For example, selecting the electrical property according to the target electric field pattern may also involve concurrently selecting the mechanical property and, in the case that fulfilling the specific need for the electrical property and at the same time fulfilling the specific need for the mechanical property is not possible, choosing which one of the electrical property and the mechanical property is to be fulfilled, e. g. when a level of importance for fulfilling the specific need of one of the properties exceeds a corresponding level of importance for fulfilling the specific need of the other one of the properties.

Likewise, for example, selecting the mechanical property may also involve concurrently selecting the electrical property and, in the case that fulfilling the specific need for the electrical property and at the same time fulfilling the specific need for the mechanical property is not possible, choosing which one of the electrical property and the mechanical property is to be fulfilled, e. g. when a level of importance for fulfilling the specific need of one of the properties exceeds a corresponding level of importance for fulfilling the specific need of the other one of the properties.

Typically, the physical properties of the part and of the subsequent part are substantially material inherent properties. For example, the electrical property and the mechanical property of the part and the subsequent part are substantially material inherent properties. Material inherent properties are defined and/or obtained by the involved material alone. However, a shape of the subsequent part may contribute to the physical property in question, e. g to the electrical property and/or the mechanical property.

Forming the subsequent part, as used herein, typically comprises providing or applying a material and setting, or curing, the material. For example, in a typical additive manufacturing technique, the material is applied and cured by a laser light emission.

The subsequent part being at least partially in contact with the part may include the subsequent part covering at least one surface of the part. Furthermore, the subsequent part being at least partially in contact with the part may include the subsequent part surrounding the part, covering the part in its entirety, or ensheathing the part. "Partially", in this context, typically means that at least a partial area is involved, i. e. that the subsequent part is in contact with the part at least in a partial area of the part.

In embodiments, the electrical property comprises a dielectric permittivity, an electric conductivity, or a combination thereof. For example, a dielectric permittivity as the electrical property may be chosen such that a target behavior of the electrical power device is achieved at a time that an electrical field is applied to the electrical power device. In particular, the target behavior may include an electrical field grading behavior, such as an active field grading, field control or field shaping.

As a non-limiting example, an electrical power device comprises an insulating portion that is to be located on a ground side when in an assembled state, and high electrical field strengths may be present at the surface of the insulating portion due to a certain shape of the insulating portion, such as a curvature. In particular in HVDC applications, a high electrical field strength may lead to a charge accumulation in this area, which may adversely affect the operation of the electrical power device.

In conventional solutions, a field control feature is limited in shape and complexity since the respective field control devices are mounted in an electrode area of an electrical power device, or the electrical power device needs to have an open structure (an accessible structure) in order to be suitable for a casting or molding process. Thus, in the conventional solutions, a field control feature might not be achievable in the above-described insulating portions of a conventional electrical power device.

In the solutions described herein, the field control feature may be provided as a subsequent part formed by the additive manufacturing technique. In order to obtain the field control feature (in order to achieve an electrical field grading), a plurality of subsequent parts may be formed, wherein materials with different electrical permittivities are used in varying concentrations for the different subsequent parts.

In embodiments, the mechanical property comprises a mechanical strength, an elasticity, a plasticity, or a combination thereof. In an exemplary case, a plurality of subsequent parts may be formed, wherein materials with different elasticities are used in varying concentrations for the different subsequent parts.

In embodiments, the physical property includes a thermal property, and the thermal property comprises a thermal conductivity, a thermal transmittance, a thermal capacity, or a combination thereof. In an exemplary case, a plurality of subsequent parts may be formed, wherein materials with different thermal conductivities are used in varying concentrations for the different subsequent parts.

In embodiments, the part and the subsequent part are insulating parts. However, the part may also be an electrical conductor, such as an electrode, and the subsequent part is an insulating part. The electrical conductor may be formed in a conventional production process. In embodiments, the part is formed by means of an additive manufacturing technique. In the case that the part is an electrical conductor, such as an electrode, the electrical conductor may be produced in an additive manufacturing technique involving metal processing, such as selective laser sintering or direct metal laser sintering. The additive manufacturing technique for obtaining the electrical conductor as the part, and the additive manufacturing technique for obtaining insulating part as the subsequent part, may combine a metal processing and a polymer processing.

In embodiments, performing the selection of the physical property of the subsequent part and the forming of the subsequent part includes varying a material ratio, or material concentration, of at least two different materials from the forming of the part to the forming of the at least one subsequent part, the two different materials exhibiting differences in the respective physical property.

The varying may comprise an abrupt change, a continuous change or gradual change. By a continuous change or gradual change a subsequent part may be obtainable that has a gradient of the respective physical property.

For example, performing the selection of the electrical property of the subsequent part and the forming of the subsequent part according to the determined target electrical field pattern includes varying a material ratio, or material concentration, of at least two different materials from the forming of the part to the forming of the at least one subsequent part. Further in the example, additionally or alternatively, performing the selection of the mechanical property of the subsequent part and the forming of the subsequent part according to the determined spatial distribution of the target mechanical strength includes varying a material ratio, or material concentration, of at least two different materials from the forming of the part to the forming of the at least one subsequent part. The varying may comprise an abrupt change, continuous change or gradual change. The at least two different materials typically have different electrical permittivities, different electrical conductivities, different flexibilities, or a combination thereof.

In embodiments, the method comprises, by means of an additive manufacturing technique, forming multiple subsequent parts, wherein a material ratio of at least two different materials is varied, particularly gradually varied, in order to obtain the multiple subsequent parts.

According to a further aspect of the present disclosure, an electrical power device is provided. The electrical power device is obtainable or obtained by a method described herein.

In embodiments, the electrical power device comprises an electrical field grading part formed as one or more of the subsequent parts, the electrical field grading part being configured, at a time the electrical power device is subjected to an electrical field, particularly an high voltage field such as a HVAC or a HVDC electrical field, to alleviate an electrical field density of the electrical field. An electrical field grading part generally corresponds to the field grading feature described herein, whereby a field grading or field control property may be obtained.

In embodiments, the electrical power device comprises an elastic relaxation part formed as one or more of the subsequent parts, the elastic relaxation part being configured to transfer an externally applied stress into a plastic deformation of the elastic relaxation part.

According to yet another aspect of the present disclosure, a use of an electrical power device is provided. The electrical power device is obtainable or obtained by a method described herein. The use comprises using the electrical power device as an AC or DC insulator in a HVAC or HVDC apparatus, particularly in an HVAC or HVDC switchgear or in an HVAC or HVDC circuit breaker.

According to yet another aspect of the present disclosure, another use of an electrical power device is provided. The electrical power device is obtainable or obtained by a method described herein. The use comprises using the electrical power device as a field grading device in a HVAC or HVDC structure, particularly in a HVAC or HVDC cable joint.

With the aspects, features and embodiments described herein, an electrical power device, such as an insulating device, may be provided with tailor-made mechanical and electrical properties. The production costs may be lowered, in particular when comparing with a conventional molding or casting process. Specifically, no molds are needed, which allows for a fast prototyping and fast changes to the electrical power device. Also, comparatively complex shapes (such as hollow structures) and/or lightweight shapes can be achieved. Furthermore, different materials can be combined in a single composite.

BRIEF DESCRIPTION OF THE DRAWINGS

Embodiments of the present disclosure will be described with reference to the accompanying drawings in which.

DESCRIPTION OF EMBODIMENTS

Figure 1A:
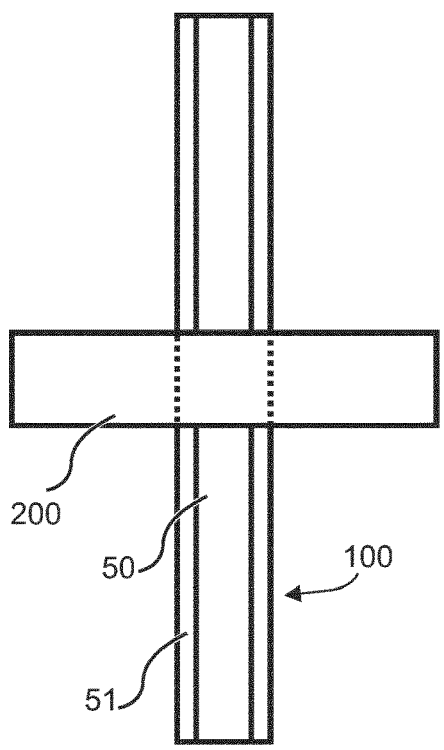
FIGS. 1a-1c are schematic sectional views of electrical power devices according to embodiments of the present disclosure.
Figure 1B:
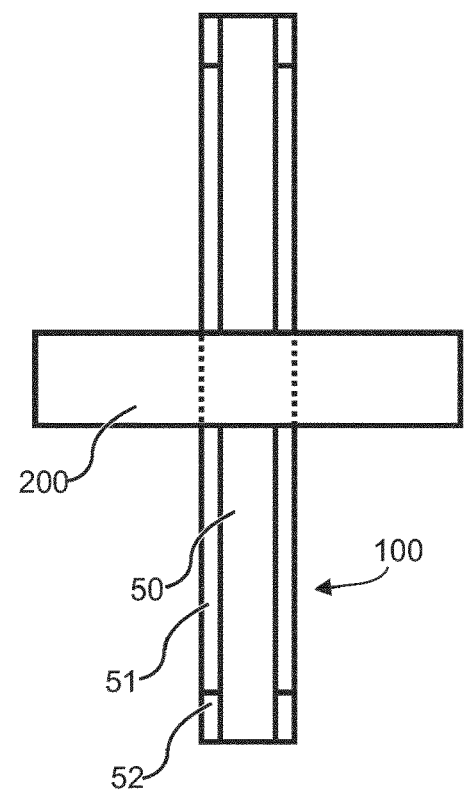
Figure 1C:
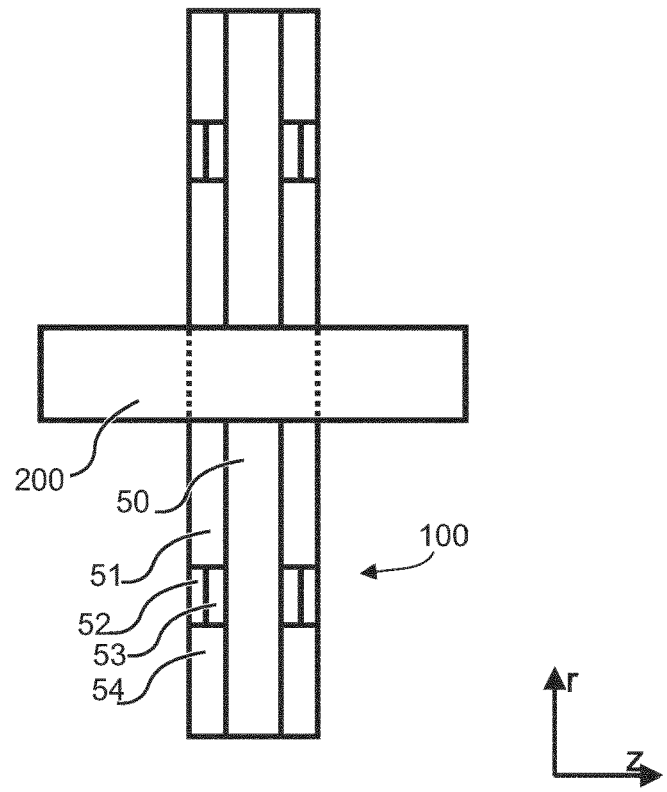

FIGS. 1a-1c are each a schematic sectional view of an electrical power device 100. The parts common to the electrical power devices 100 shown in FIGS. 1a-1c are described once and not repeated for the single electrical power devices. The electrical power device 100 has an insulating base body 50 through which a conductor electrode 200 is passed and fixed from both sides. The electrode 200 is e. g. made of a metal material and has a high voltage applied thereto, which is to be insulated by the insulating base body 50 of the electrical power device 10, e. g. vis-à-vis a ground electrode (not shown). The ground electrode is for example a part of a housing of a gas insulated switchgear (GIS) compartment. In the exemplary case of a GIS, electrical power device 100 needs to be gas-tight from one side to the other (in the drawings, gas-tight in the left-right direction.

Thus, the electrical power devices 100 in the embodiments shown herein mechanically support the electrode 200, provide an electrical insulating function between ground and phase (phase-to-phase is also common in other types of applications), and provide a mechanical withstand of pressure differences in the GIS application.

In the embodiments shown in the drawings, the insulating base body 50 is formed as a part of the electrical power device 100. The part 50 may be formed, for example, by an additive manufacturing technique such as 3D printing, e. g. by vat photopolymerization, material extrusion, material jetting, powder based 3D printing, or lamination based 3D printing. The part 50 may exhibit defined physical properties of one or more of an electrical property, a mechanical property, a thermal property, a magnetic property. One or more of the physical properties may be substantially uniform; alternatively, one or more of the physical properties may vary throughout the part 50, for example show a gradient behavior. Typically, a gradient behavior of the part 50 is in the direction substantially perpendicular to the running direction of the electrode 200.

In addition, the electrode 200 or parts of the electrode 200, such as an electrode insert of the electrical power device 100, may also be formed by an additive manufacturing technique that is suitable for processing a metal material, such as powder based 3D printing. The electrode 200 may also be formed in a traditional electrode forming process.

In each of the embodiments of FIGS. 1a-1c, at least one subsequent part 51, 52, 53, 54 is formed by means of an additive manufacturing technique such as 3D printing, e. g. by vat photopolymerization, material extrusion, material jetting, powder based 3D printing, or lamination based 3D printing.

The electrical power devices 100 in the embodiments are mainly axially symmetric. Thus, the additive manufacturing may include providing a rotating substrate (e. g., a part of the electrode 200 such as an electrode insert) and moving a 3D printer head along the rotating substrate, i. e. in the two translator directions perpendicular to the axis of rotation. In this way, the parts 50, 51, 52, 53, 54 can be built up. However, the electrical power devices 100 are not limited to an axially symmetric shape and the additive manufacturing method involving a rotating substrate.

As soon as one of the parts 50, 51, 52, 53, 54 is finished, the part that is to be formed next becomes the subsequent part, as used herein, which refers to its antecedent part. Prior to performing the additive manufacturing process of any of the subsequent parts 51, 52, 53, 54, a physical property, such as an electrical property and a mechanical property, of the respective subsequent part 51, 52, 53, 54 is selected. The physical property may be selected such as to be different from a corresponding physical property of the (antecedent) part. In general, at least one physical property, typically at least one of the electrical property and the mechanical property, is changed (i. e., selected to be different) when transitioning to a subsequent part from its respective antecedent part.

A physical property of the (antecedent) part need not necessarily be uniform. For example, as mentioned above, a physical property of the part 50 may show a gradient behavior, typically a gradient behavior in a direction substantially perpendicular to the electrode. The respective physical property of the subsequent part 51, 52, 53, 54 may also show a gradient behavior, i. e. be selected such as to be different to the respective physical property in the adjacent region of the (antecedent) part 50.

In FIG. 1a, on the insulating base body 50, a subsequent part 51 has been applied over the entire radial direction (r-direction) of the electrical power device 100. In the selecting, as an exemplary case, it has been decided to change multiple physical properties, e. g. both the electrical and the mechanical properties. The exemplary subsequent part thus 51 has electrical and mechanical properties selected to be different from those of its antecedent part 50. It could also have been decided to only change one physical property, e. g. one of the electrical and mechanical properties, such that another exemplary subsequent part 51 only has the corresponding property changed in comparison to its antecedent part 50.

In FIG. 1b, on the insulating base body 50 of the electrical power device 100, a subsequent part 51 has been applied in a part in the radial direction r, and subsequent part 52 has been applied in another part in the radial direction r. Again, as described before with reference to FIG. 1a, the subsequent part 51 has a physical property, such as an electrical property, a mechanical property, or both, different from its antecedent part 50. Likewise, the subsequent part 52 has the corresponding physical property or properties, such as the electrical property, the mechanical property, or both, different from its antecedent part 51.

FIG. 1c shows another example of an electrical power device 100. On the insulating base body 50, a subsequent part 51 has been applied in a part in the radial direction r. In another part in the radial direction, a stacking—in the z-direction—of subsequent parts 52 and 53 has been applied. In another part in the radial direction, a subsequent part 54 has been applied. Again, as described before with reference to FIG. 1a, the subsequent part 51 has a physical property, such as an electrical property, a mechanical property, or both, different from its antecedent part 50. Likewise, the subsequent part 52 has the corresponding physical property or properties, e. g. the electrical property, the mechanical property, or both, different from its antecedent part 51. Likewise, the subsequent part 53 has the corresponding physical property or properties, e. g. the electrical property, the mechanical property, or both, different from its antecedent part 52. Likewise, the subsequent part 54 has the corresponding physical property or properties, e. g. the electrical property, the mechanical property, or both, different from its antecedent part 53.

Figure 2:
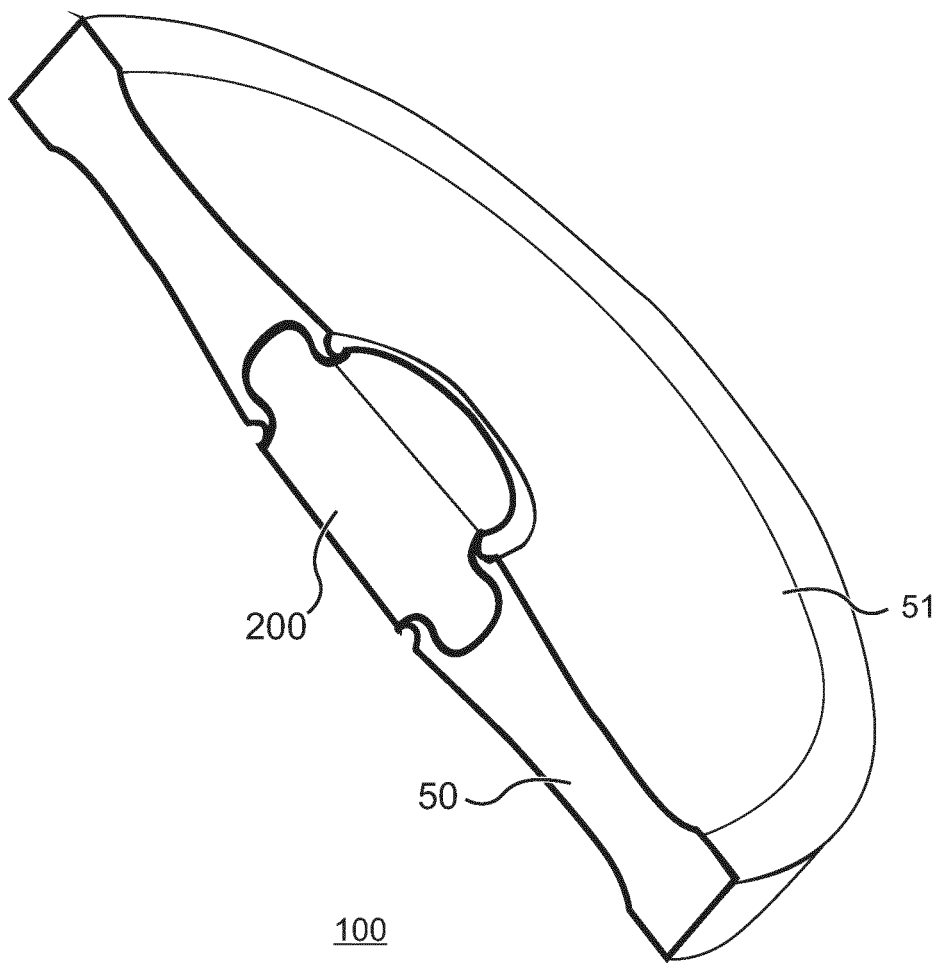
FIG. 2 is a schematic perspective view of an electrical power device according to an embodiment of the present disclosure.

FIG. 2 shows a schematic perspective view of an electrical power device 100 according to an embodiment of the present disclosure. The electrical power device 100 has a base body 50 made of an insulating material, the base body 50 having an electrode insert 200 of an electrical conducting material. On the base body 50, a layer of insulating material 51 has been applied, the layer 51 forming a subsequent part of the electrical power device (having the base body 50 as the antecedent part), and the insulating material of the layer 51 being selected such as to have a physical property different from a corresponding physical property of the base body. For example, the insulating material of the layer 51 is selected such as to have an electrical property different from a corresponding electrical property of the base body 50, a mechanical property different from a corresponding mechanical property of the base body 50, or both.

Figure 3:
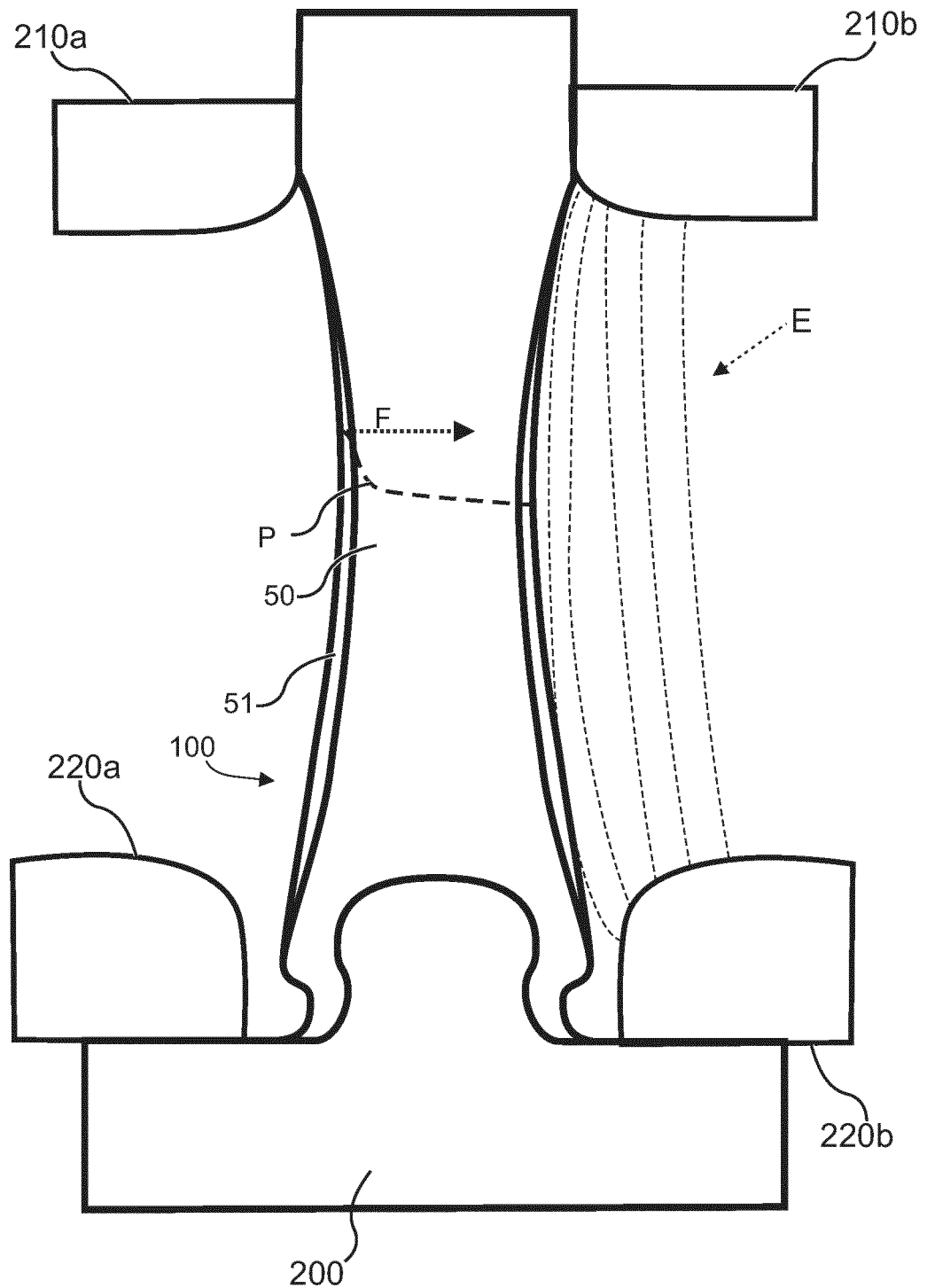
FIG. 3 is a schematic sectional view of an electrical power device according to an embodiment of the present disclosure installed in a switchgear apparatus.

FIG. 3 shows a schematic sectional view of the electrical power device 100 of FIG. 2 in a gas insulated switchgear apparatus. Inner conductive support parts 220a, 220b of the gas insulated switchgear support an electrode attached to the electrode insert 200 of the electrical power device 100, the electrode being on a high voltage. Outer conductive support parts 210a, 210b forming a housing part of the gas insulated switchgear support a radially outer part of the electrical power device 100. A region left and right from the electrical power device 100 in FIG. 3 is filled with insulating gas, such as $SF_6$ gas, in order to achieve an advantageous insulating behavior.

The electrical properties of the base body 50 have an insulating behavior sufficient for insulating the electrode 200 vis-à-vis the housing 210a, 210b. The electrical properties of layer 51 have been selected to allow a field grading of an electrical field present inside the gas insulated switchgear apparatus. As an example, by the field grading properties, the electrical field lines E in FIG. 3 do not end on the insulator surface, preventing an accumulation of charges particularly in HVDC applications.

In FIG. 3, P denotes an exemplary path of principal mechanical stress of the electrical power device 100. An exemplary force F acts on the electrical power device 100. The mechanical properties of layers 50 and 51 have been selected to allow a mechanical grading of the electrical power device 100 by varying the flexibilities of the materials involved. Thereby, higher overall mechanical strength along the path P is achieved. Not only can the stresses be reduced by such a selected distribution of different materials; also elastic relaxation zones may be implemented where stresses from the outside can be macroscopically transferred into plastic deformation and thus removed from the insulator supporting structure.

Figure 4:
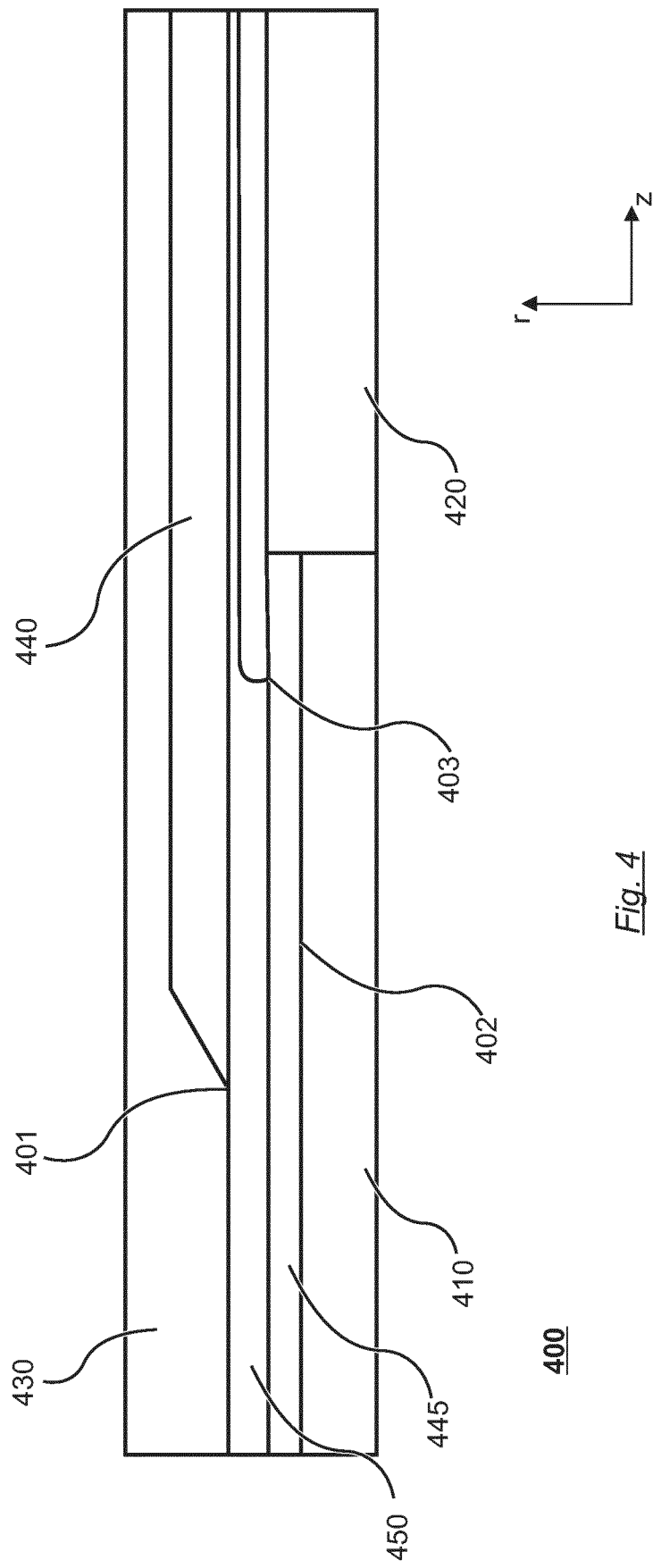
FIG. 4 is a schematic sectional view of an electrical power device according to an embodiment of the present disclosure mounted in a cable joint.

FIG. 4 shows a schematic sectional view of an electrical power device 450 as a part of a cable joint 400, such as a high voltage DC cable joint. In FIG. 4, r denotes the radial direction, whereas z denotes the axial direction. In a powered state, a cable conductor 410 and a cable connector, or deflector, 420 are on a high voltage, whereas a screen 430 is on ground potential. The cable conductor 410 and the cable connector 420 abut on each other in the axial direction z. A cable insulation 445 covers the cable conductor 410, in the axial direction z, up to the cable connector 420. A joint insulation 440 extends from the area of the cable connector 420 up to a predetermined distance in the axial direction z.

The electrical power device 450 is sandwiched in between cable insulation 445 or the cable connector 420, respectively, on the one side in the radial direction r, and the screen 430 or the joint insulation 440, respectively, on the opposite side in the radial direction r. In the embodiment of FIG. 4, the electrical power device 450 serves as a field grading element, or field grading tube. Furthermore, the electrical power device 450 has to bear a considerable mechanical stress.

In the embodiment of FIG. 4, for a given geometrical and electrical configuration of the electrical power device 450 in the cable joint 400, a target spatial distribution (a desired spatial distribution) of the electrical field is determined. Likewise, for the given configuration of the electrical power device 450 in the cable joint 400, a target spatial distribution (a desired spatial distribution) of the mechanical strength is determined.

The electrical power device 450 is manufactured via a method as disclosed herein according to the determined spatial distribution of the electrical field and according to the determined spatial distribution of the mechanical stress. For example, the target electrical field pattern (the desired electrical field pattern) of the electrical power device 450 in the installed state is determined, e. g. by way of simulation. Likewise, for example, a path of principal mechanical stress of the electrical power device 450 is determined, e. g. by way of simulation.

At least one electrical property, such as a conductivity or a dielectric permittivity, an electric conductivity, or a combination thereof, that complies or comply with the target electrical field pattern for the electrical power device 450 is selected for the corresponding location during the manufacturing process via the additive manufacturing technique.

Likewise, at least one mechanical property, such as a mechanical strength, an elasticity, a plasticity, or a combination thereof, that complies or comply with the path of principal mechanical stress of the electrical power device 450 is selected for the corresponding location during the manufacturing process via the additive manufacturing technique.

Thereby, the electrical power device 450 according to the present embodiment of FIG. 4, i. e. the field grading tube 450 for the cable joint 400, is obtained.

The present disclosure has been mainly described with reference to embodiments; however, a person skilled in the art will readily appreciate that other embodiments than the ones described above are part of the present disclosure, wherein the scope is defined by the appended claims.

The invention claimed is:

1. A method for producing an electrical power device from subsequently manufactured parts by an additive manufacturing technique, the method comprising:
    determining a target spatial distribution for a plurality of physical properties of the electrical power device, the physical properties being at least one of an electrical property and a mechanical property;
    forming a part of the electrical power device;
    selecting physical properties of at least one subsequent part of the electrical power device corresponding to the determined spatial distribution of the plurality of physical properties; and
    forming the at least one subsequent part using the additive manufacturing technique such that the at least one subsequent part is at least partially in contact with the part;
    wherein the at least one subsequent part includes an elastic relaxation part that is configured to transfer an externally applied stress into a plastic deformation of the elastic relaxation part.

2. The method according to claim 1, wherein the spatial distribution of the physical property is a target electrical field pattern (E) of the electrical power device when mounted in a given electrical environment, or a target mechanical strength of the electrical power device.

3. The method according to claim 2,
    wherein performing the selection of the electrical property of the at least one subsequent part and the forming of the at least one subsequent part according to the determined target electrical field pattern (E) includes varying a material ratio of at least two different materials from the forming of the part to the forming of the at least one subsequent part.

4. The method according to claim 1,
the physical property being an electrical property comprising at least one of a dielectric permittivity, an electric conductivity, or a combination thereof.

5. The method according to claim 1, wherein the part and the at least one subsequent part are insulating parts.

6. The method according to claim 1, wherein the part is formed using the additive manufacturing technique.

7. The method according to claim 1, comprising forming multiple subsequent parts using the additive manufacturing technique, wherein a material ratio of at least two different materials is varied to obtain the multiple subsequent parts.

8. The method according to claim 7, wherein the material ratio of the at least two different materials is gradually varied to obtain the multiple subsequent parts.

9. An electrical power device produced using the method according to claim 1.

10. The electrical power device according to claim 9, comprising an electrical field grading part formed as one or more of the at least one subsequent part, the electrical field grading part being configured, at a time the electrical power device is subjected to an electrical field to alleviate an electrical field density of the electrical field.

11. The electrical power device of claim 9, the electrical power device being at least one of an electrical insulator device or an electrical field grading device.

12. The method according to claim 1,
    wherein the spatial distribution of the physical property is a target mechanical strength of the electrical power device.

13. The method according to claim 12,
    wherein determining the spatial distribution of target mechanical strength of the electrical power device includes identifying a path (P) of principal mechanical stress of the electrical power device;
    wherein performing the selection of the mechanical property of the at least one subsequent part and the forming of the at least one subsequent part includes forming one or more of the subsequent parts having a mechanical strength equal to or greater than a predetermined strength threshold value along the identified path (P) of principal mechanical stress.

14. The method according to claim 12,
    wherein performing the selection of the mechanical property of the at least one subsequent part and the forming of the at least one subsequent part according to the determined spatial distribution of the target mechanical strength includes varying a material ratio of at least two different materials from the forming of the part to the forming of the at least one subsequent part.

15. The method according to claim 1,
the physical property being a mechanical property comprising at least one of a mechanical strength, an elasticity, a plasticity, or a combination thereof.

16. A method comprising:
    providing an electrical power device produced by a process comprising:
    determining a target spatial distribution for a plurality of physical properties of the electrical power device, the physical properties being at least one of an electrical property and a mechanical property;
    forming a part of the electrical power device;
    selecting physical properties of at least one subsequent part of the electrical power device corresponding to the determined spatial distribution of the plurality of physical properties; and
    forming the at least one subsequent part using an additive manufacturing technique such that the at least one subsequent part is at least partially in contact with the part, wherein the at least one subsequent part includes an elastic relaxation part that is configured to transfer an externally applied stress into a plastic deformation of the elastic relaxation part; and
    using the electrical power device in at least one of an HVAC or HVDC apparatus.

17. The method of claim 16, wherein the electrical power device in at least one of an HVAC or HVDC apparatus further comprises using the electrical power device as at least one of an AC or DC insulator in at least one of an HVAC or HVDC switchgear or an HVAC or HVDC circuit breaker.

18. The method of claim 16, wherein the electrical power device in at least one of an HVAC or HVDC apparatus further comprises using the electrical power device as a field grading device in at least one of an HVAC or HVDC cable joint.

* * * * *